F. J. TONE & T. B. ALLEN.
PROCESS OF SILICIDIZING.
APPLICATION FILED SEPT. 17, 1912.
1,054,372.
Patented Feb. 25, 1913.
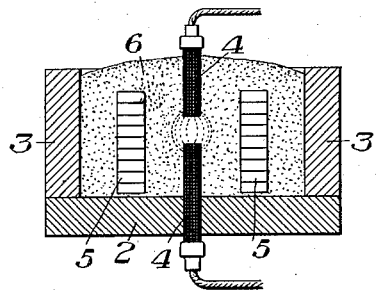
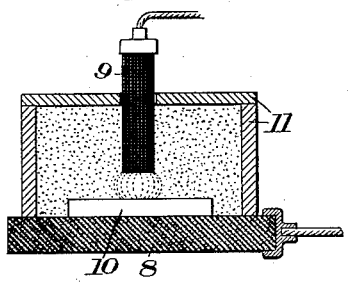 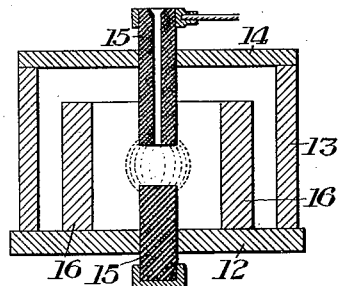
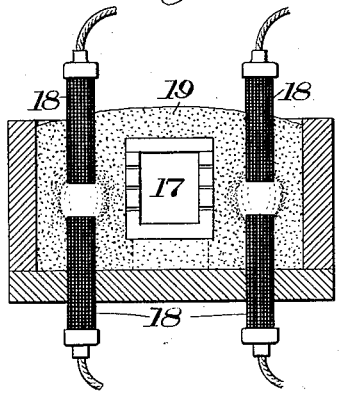
WITNESSES
INVENTORS

UNITED STATES PATENT OFFICE.

FRANK J. TONE AND THOMAS B. ALLEN, OF NIAGARA FALLS, NEW YORK, ASSIGNORS TO THE CARBORUNDUM COMPANY, OF NIAGARA FALLS, NEW YORK, A CORPORATION OF PENNSYLVANIA.

PROCESS OF SILICIDIZING.

1,054,372.

Specification of Letters Patent.

Patented Feb. 25, 1913.

Application filed September 17, 1912. Serial No. 720,766.

*To all whom it may concern:*

Be it known that we, FRANK J. TONE and THOMAS B. ALLEN, both residents of Niagara Falls, in the county of Niagara and State of New York, have invented a new and useful Process of Silicidizing, of which the following is a full, clear, and exact description, reference being had to the accompanying drawings, forming part of this specification, in which—

Figure 1 is a vertical section of one form of furnace which may be employed in carrying out our invention; and Figs. 2, 3 and 4 are similar views illustrating other forms of furnaces.

This invention has relation to a new and useful process for the conversion of shaped articles into silicon carbid. In accordance with the process described in United States Patent 992,698, issued to Frank J. Tone, May 16th, 1911, shaped articles consisting of silicon carbid and carbonaceous material are subjected to the action of silicon-containing vapors at a suitable temperature whereby the carbonaceous material is changed into silicon carbid. The resultant articles consist, therefore, of substantially pure silicon carbid and have many valuable uses for electrical and refractory purposes. It is found very difficult to effect a complete conversion of silicidization throughout the whole mass and particularly in the interior of the mass. We have found that the depth of penetration and the concentration of the silicon-containing vapors in the shaped articles is dependent, among other things, on the partial pressures of these vapors; and that it is essential to have a high vapor tension of the silicon-containing vapors in order to yield products of large mass which are completely silicidized. It has been the practice to effect the silicidizing action by the use of an electrical incandescent furnace. We have now found that the electric arc furnace process is very efficient and economical and that it is readily possible to obtain a high vapor pressure of the silicon-containing vapors by the use of the arc.

We will now describe a preferred manner in which the invention may be carried out, reference being made to the accompanying drawing forming part of this specification.

Fig. 1 shows a sectional elevation of a suitable type of furnace. 2 is the base of the furnace made of refractory material and 3, 3 are the side walls forming a receptacle open at the top. 4, 4 are vertical superposed electrodes, the lower electrode extending through the base of the furnace and the upper electrode being adjustably suspended in a vertical line above it. 5, 5 represent the shaped articles which may consist of a mixture of 80% by weight of silicon carbid and 20% by weight of petroleum coke, being bound with a temporary binder, such as tar or glutrin and pressed into the required shapes. 6 is a mixture which may be composed of 70 parts by weight of silica sand and 30 parts by weight of coke. In certain cases, it is desirable to have this mixture porous for the free circulation of the gases, and in such cases it is advantageous to add 10% of saw-dust; or instead of this, the mixture may be briqueted or coarsely ground. After the furnace is thus charged, the electric arc is started between the electrodes and the mixture of silica and carbon surrounding the arc and the charge of shaped articles to be converted is raised to the formation temperature of silicon carbid. A cavity is formed around the arc, the walls of the cavity being composed of silicon carbid. This prevents the mixture from falling into the space between the electrodes and forming a resistance path for the current from one electrode to the other. There is also substantially little leakage of current from the mixture around the arc zone from one electrode to the other, the major portion of the energy being expended in the arc. The process is continued at this temperature until a definite amount of electrical energy is consumed. This is found by experiment and varies with different shaped bodies. When the process is finished the furnace charge is removed and the articles are obtained converted into the desired form of silicon carbid.

Many other furnace arrangements are possible for obtaining silicidization by means of the arc.

In Fig. 2 we show a form in which the arc is placed directly upon the articles to be silicidized. The base 8 of the furnace constitutes one terminal of the furnace and the electrode 9 the other terminal. The block 10 to be silicidized is laid on the base of the furnace to make electrical contact therewith.

The arc is sprung from the vertical electrode to the surface of the block 10; and silicon-containing vapors are formed which accomplish the conversion in the block. It is desirable to inclose the arc by suitable walls and cover 11, so that the silicon-containing vapors will be confined to the chamber.

In Fig. 3, 12 is the base of the furnace, 13 the side walls, and 14 the cover, these parts forming altogether a closed chamber in which the arc is formed between vertical superposed electrodes 15 extending through the base and cover of the furnace. The article to be silicidized is, for example, a cylinder 16, consisting of silicon carbid and carbon, of the proportions already stated for the shaped articles in Fig. 1. The arc is sprung between the electrodes, and silicon-containing vapors are obtained by introducing silicious material through the passage in the upper electrode. This material may be silica in powdered form or some volatile compound of silicon.

In Fig. 4 is shown a method in which a closed chamber 17 is heated by means of arcs, produced by electrodes 18, and in which the silicon-containing vapors are generated in a mixture 19 of silica and carbon surrounding the arcs and the chamber are caused to permeate the chamber and silicidizes articles which are placed therein.

The methods we have described have great advantages in that the heat can be generated just where it is desired and consequently the loss of electrical energy is very small and the process efficient. Furthermore, the heat can be confined in a comparatively small space and it is, therefore, a simple matter to obtain a high vapor pressure of the silicon-containing gases. On account of the ability to obtain a high partial pressure of the silicon-containing vapors the products obtained are much more completely silicidized and are, therefore, tougher and have many other advantages for electrical and refractory purposes.

We claim:

1. The process of converting shaped carbonaceous articles into silicon carbid, which consists in subjecting said articles to the action of silicon-containing vapors of high vapor pressure produced by the electric arc.

2. The process of silicidizing carbonaceous articles which consists of placing said articles in a mixture of siliceous and carbonaceous material, and forming an electric arc within said mixture whereby said articles are heated and silicon-containing vapors are caused to permeate the articles and silicidize them.

3. The process of silicidizing carbonaceous articles, which consists in surrounding them with a material capable of producing silicon-containing vapors, and then subjecting the articles and material to heat generated by an electric arc.

In testimony whereof, we have hereunto set our hands.

FRANK J. TONE.
THOS. B. ALLEN.

Witnesses as to Frank J. Tone:
  THOS. DEAN,
  W. A. DWYER.

Witnesses as to Thomas B. Allen:
  H. C. COXE,
  JOHN BAKER.